(12) United States Patent
Shigeta

(10) Patent No.: US 8,366,169 B2
(45) Date of Patent: Feb. 5, 2013

(54) ARTICLE STORAGE STRUCTURE OF MOTORCYCLE

(75) Inventor: Yasuhiro Shigeta, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 354 days.

(21) Appl. No.: 12/696,459

(22) Filed: Jan. 29, 2010

(65) Prior Publication Data

US 2010/0194131 A1 Aug. 5, 2010

(30) Foreign Application Priority Data

Feb. 3, 2009 (JP) ................................ 2009-022602

(51) Int. Cl.
*B62K 19/46* (2006.01)
(52) U.S. Cl. .................................................. 296/37.15
(58) Field of Classification Search .................... 296/67, 296/66, 65.17, 68.17, 68.18, 37.1, 37.14, 296/37.15; 297/378.12; 180/215, 219; 224/247
See application file for complete search history.

(56) References Cited

U.S. PATENT DOCUMENTS

| 5,040,632 | A | * | 8/1991 | Fujii et al. | ..................... | 180/219 |
| 5,172,788 | A | * | 12/1992 | Fujii et al. | ..................... | 180/219 |
| 6,336,579 | B1 | * | 1/2002 | Sako | ........................... | 224/413 |
| 2003/0132048 | A1 | | 7/2003 | Hata | | |

FOREIGN PATENT DOCUMENTS

| JP | 9-99882 | 4/1997 |
| JP | 2000-108967 | 4/2000 |
| JP | 2001233265 | 8/2001 |

OTHER PUBLICATIONS

Extended European Search Report Application No. 10152413.0 dated Jul. 15, 2011.

* cited by examiner

*Primary Examiner* — Glenn Dayoan
*Assistant Examiner* — Pinel Romain
(74) *Attorney, Agent, or Firm* — Barnes & Thornburg LLP

(57) ABSTRACT

A motorcycle includes an article storage structure and has a storage space for storing articles. The storage space is defined by a rear fender covering a rear wheel, a frame cover covering a rear portion of a motorcycle body, and a rider's seat and a passenger seat which are arranged in tandem in a longitudinal direction of the motorcycle. The storage space is provided with an onboard auxiliary machinery storage compartment for storing the onboard auxiliary machinery and an article storage compartment for storing the articles, which are formed with openings formed below the rider's seat and the passenger seat, respectively, to be opened or closed. An article holding member having a tubular shape, in which the article is stored, and having an upper end opening disposed within the article storage compartment is also disposed so as to extend rearward and upward from an upper surface of the rear fender below the rider's seat to a region of the article storage compartment.

8 Claims, 8 Drawing Sheets

ARTICLE STORAGE STRUCTURE OF MOTORCYCLE

BACKGROUND OF THE INVENTION

1. Field of the Invention

The present invention relates to an article storage structure of a motorcycle particularly suitable for storing and holding an article or like.

2. Description of the Related Art

There are known some models of motorcycles each having an article storage compartment disposed above a rear fender covering a rear wheel and having a seat serving as a cover that opens and closes the storage compartment. An onboard tool kit for daily check or other articles may be stored in such article storage compartment.

For example, a motorcycle disclosed in Japanese Patent Laid-Open Publication No. 2001-233265 (Patent Document 1) has an article storage compartment in which an onboard tool kit is held by a fixing band such as rubber band.

However, if the onboard tool kit, which is one of the articles or baggage, is secured in the article storage compartment by means of a fixing band, it is troublesome to store or take out the onboard tool kit, and the structure is not always comfortable for a user.

In addition, since the tool kit is fixedly held in the article storage compartment, it is not easy to store or take out other articles after the fixing thereof.

Furthermore, if the fixing band is used to hold the onboard tool kit, it may be required to form hooks to a rear fender for engaging the band to the rear fender. However, the forming of the hooks on the rear fender requires for forming holes in the rear fender, and hence, there is a fear of entering of muddy water or like into the article storage compartment disposed above the rear fender.

SUMMARY OF THE INVENTION

The present invention was conceived in consideration of the circumstances encountered in the prior art mentioned above and an object of the present invention is to provide an article storage structure of a motorcycle that facilitates storage and take-out of an article, such as an onboard tool kit or other baggage.

The above and other objects can be achieved according to the present invention by providing an article storage structure of a motorcycle having a storage space for storing articles including an onboard auxiliary machinery and a baggage, the storage space being defined by a rear fender covering a rear wheel, a frame cover covering a rear portion of a motorcycle body, and a rider's seat and a passenger seat which are arranged in tandem in a longitudinal direction of the motorcycle, wherein the storage space is provided with an onboard auxiliary machinery storage compartment for storing the onboard auxiliary machinery and an article storage compartment for storing the articles, the onboard auxiliary machinery storage compartment having an opening formed below the rider's seat, and the article storage compartment having an opening formed below the passenger seat, the opening of the article storage compartment being opened and closed by opening and closing the passenger seat, and an article holding member having a tubular shape, in which the article is stored, is disposed so as to extend rearward and upward from an upper surface of the rear fender below the rider's seat to a region of the article storage compartment, the article holding member having an upper end opening disposed within the article storage compartment.

In a preferred embodiment of the above aspect, it may be desired that the article holding member is formed independently from the rear fender and has a tubular main body having an upper end opening in which the article is stored and a mount portion extending from a lower end of the main body toward the onboard auxiliary machinery storage compartment located on a front side of the motorcycle body along an upper surface of the rear fender and is fastened to the rear fender, and an onboard auxiliary machinery holding member that holds the onboard auxiliary machinery is formed integrally with the mount portion. It may be also desired that the article holding member is provided with engaging members to be engaged with a front portion and a rear portion of an article of bar-shaped tool on the laterally opposite sides at the central portion of the motorcycle body at portions in vicinities of the upper end opening and the mount portion to the rear fender, respectively.

Furthermore, the rider's seat and the passenger seat may be formed independently from each other, the rider's seat is fixed to the body of the motorcycle, and the opening of the passenger seat locked by a locking member to be opened or closed by means of a key.

It may be desired that the rear fender, the frame cover, the rider's seat and the passenger seat defining the article storage space are supported by a rear frame, and the rear fender extends along a lower edge of the rear frame so as to be supported by the rear frame at front and rear portions thereof and the rear fender is also suspended by the rear frame at a central portion thereof by the article holding member, which is disposed on the rear fender, in which the central portion is attached to the rear frame at an upper end portion.

It may be also desired that the passenger seat has an upper surface located above the rider's seat and a front end portion extending downward to substantially a same level as the upper surface of the rider's seat so as to form a waist holding portion holding a waist of the rider, and a front portion of the opening of the article storage compartment is formed along a lower edge of the waist holding portion.

The article holding member may be preferably disposed so that the upper end opening of the article holding member is disposed within the article storage compartment so as to face the opening of the article storage compartment.

The article holding member may be disposed at a central position in the lateral direction of the motorcycle in a forward region of the article storage compartment.

According to the present invention, the article or baggage holding member having a tubular shape is disposed in the article storage compartment having the opening formed below the passenger seat, and the articles are stored in the article holding member. Accordingly, the articles, such as the onboard tool kit and other baggage, can be easily stored and taken out simply by opening and closing the passenger seat.

The nature and further characteristic features of the present invention will be made clearer from the following descriptions made with reference to the accompanying drawings.

DESCRIPTION OF THE PREFERRED EMBODIMENT

In the following, a preferred embodiment of the invention will be described with reference to the accompanying drawings. However, the present invention is not limited to this embodiment. It is further to be noted that terms "upper", "lower", "right", "left" and like terms are used herein with reference to the illustrations of the drawings or an actually standing state of a motorcycle.

Figure 1:
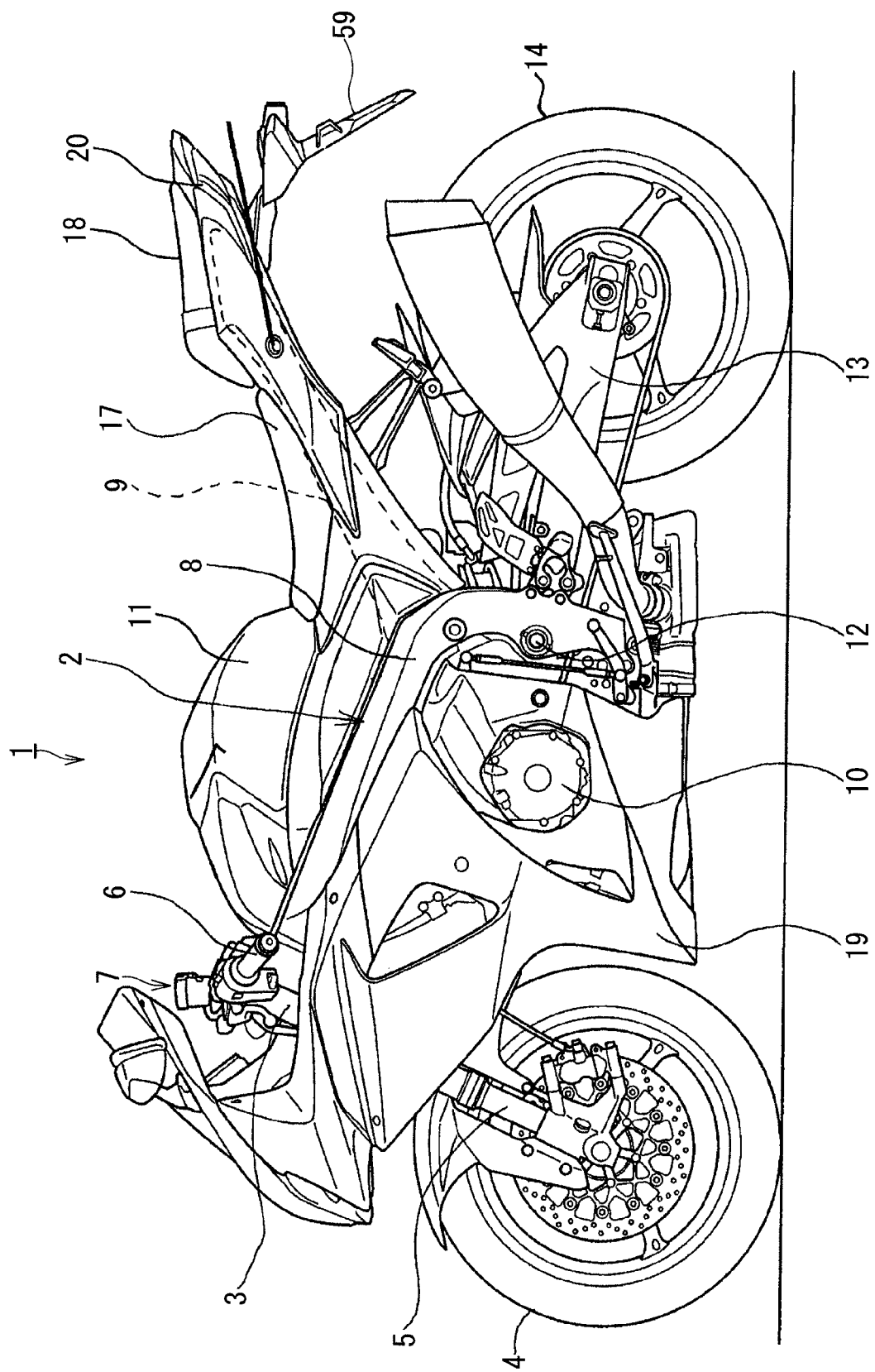
FIG. 1 is a left side view of a motorcycle provided with an article storage structure according to an embodiment of the present invention.

With reference to FIG. 1, a motorcycle 1 has a body frame 2 and a head pipe 3 mounted on a front head portion of the body frame 2. The head pipe 3 is provided with a steering mechanism 7 including a pair of left and right front forks 5 that rotatably supports a front wheel 4 and a handle bar 6. The handle bar 6 can be operated to turn the front wheel 4 left and right.

A pair of left and right tank rails 8 extend obliquely rearward and downward from the opposite sides of the head pipe 3, and a pair of left and right rear frames 9 extend obliquely rearward and upward from upper rear portions of the tank rails 8. The tank rails 8 and the rear frames 9 form the body frame 2. An engine 10 is disposed below the tank rails 8, and a fuel tank 11 is disposed above the tank rails 8. The engine 10 and the fuel tank 11 are supported by the tank rails 8.

A pivot shaft or pin 12 extends across lower rear parts of the tank rails 8. A swing arm 13 is pivotally mounted on the pivot shaft 12 so as to extend rearward of the body frame 2. A rear wheel 14 is rotatably supported on a shaft at the rear end of the swing arm 13.

Figure 8:
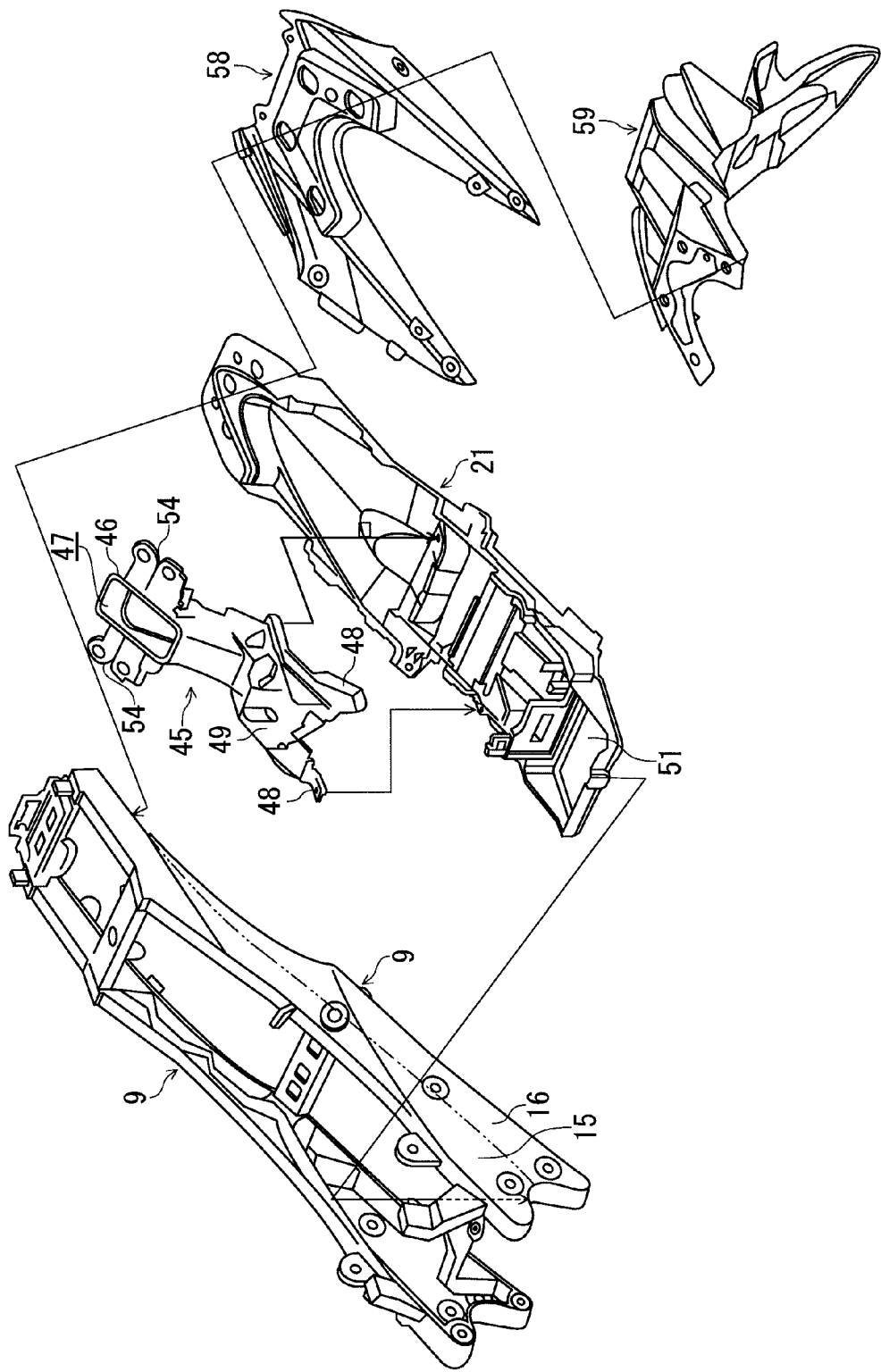
FIG. 8 is an exploded perspective view of rear frames, the rear fender, the article holding member and the like for illustrating an assembly thereof.

As shown in FIG. 8, each of the left and right rear frames 9 is integrally composed of a seat rail section 15 extending substantially horizontally and a seat pillar section 16 extending forward and downward from a middle or rear end part of the seat rail section 15 so as to provide a triangular shape as viewed from the side.

Figure 2:
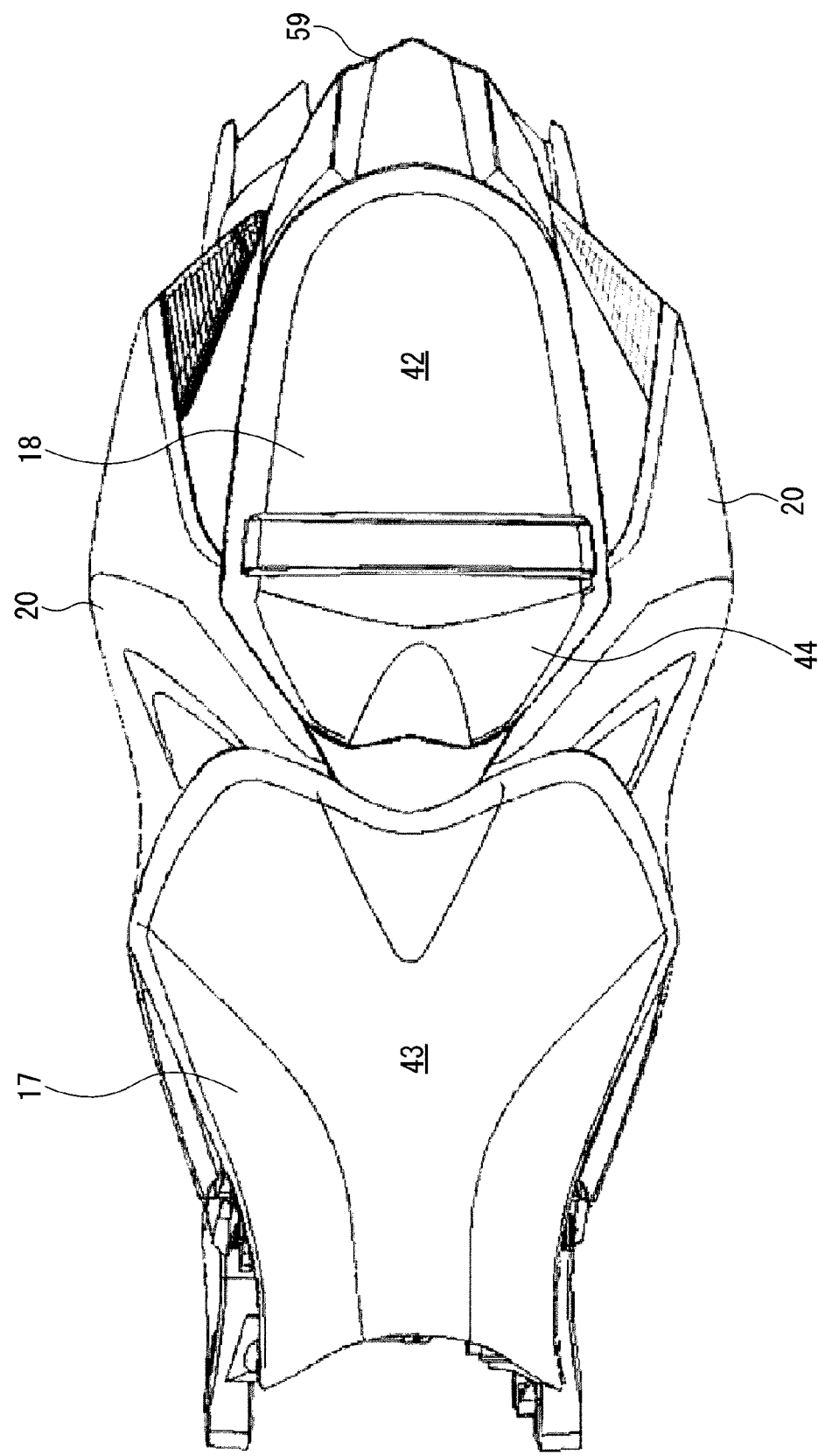
FIG. 2 is a plan view of a rear part of a motorcycle body shown in FIG. 1.

As shown in FIGS. 1 and 2, a rider's seat 17 and a passenger seat 18 are arranged in tandem in the longitudinal direction of the motorcycle and supported by the seat rail sections 15 of the pair of left and right rear frames 9.

A front cowling 19 of the motorcycle 1 covers the steering mechanism 7 disposed above the front wheel 4, and both side portions of the rear frame 9 of the rear portion of the motorcycle body are also covered by frame covers 20, respectively, so as to reduce air resistance and improve an outer configuration of the motorcycle. The front cowling 19 is supported by the tank rails 8, and the frame covers 20 are supported by the rear frames 9.

Figure 3:
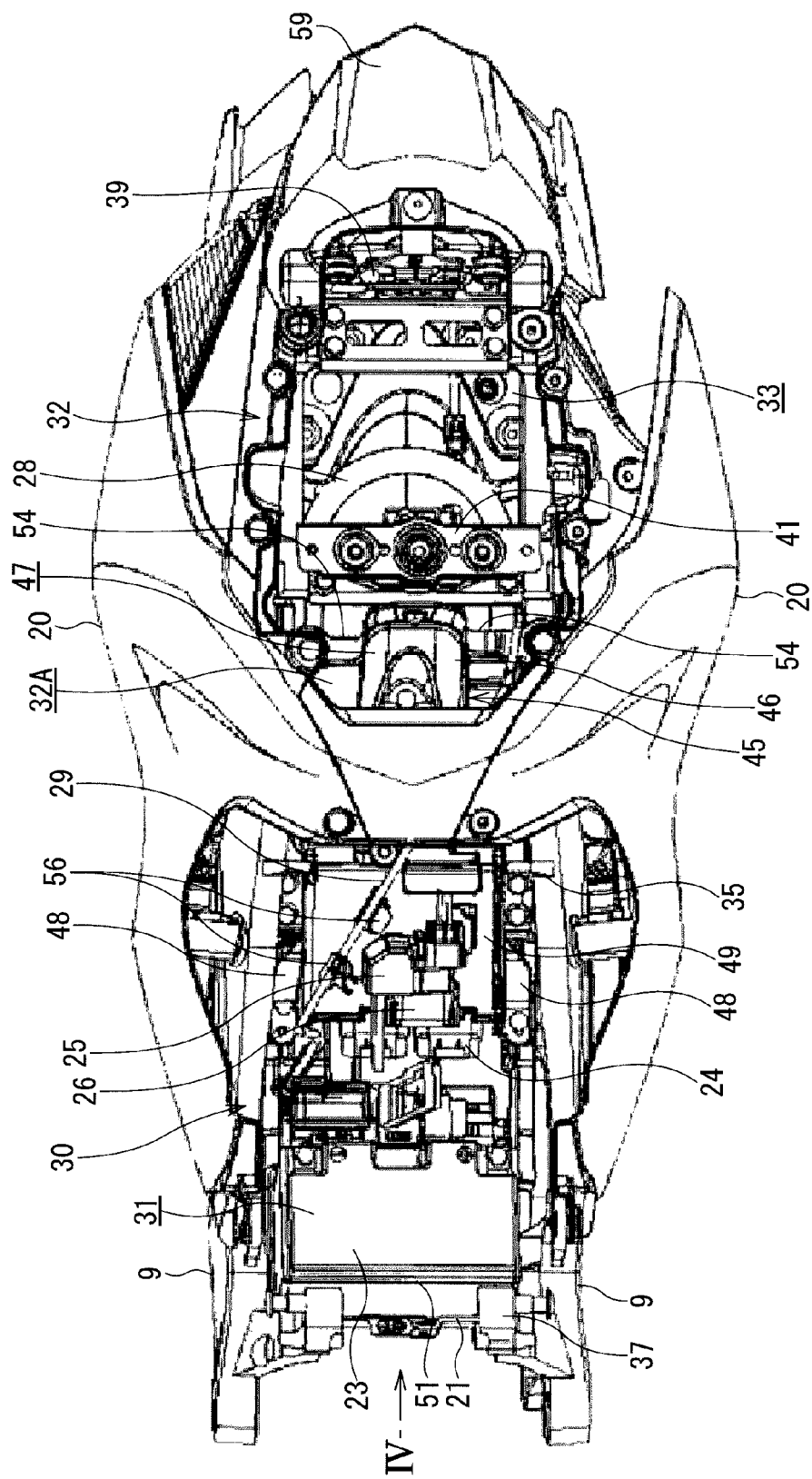
FIG. 3 is a plan view of the rear part of the motorcycle body shown in FIG. 2 with a rider's seat and a passenger seat removed.
Figure 4:
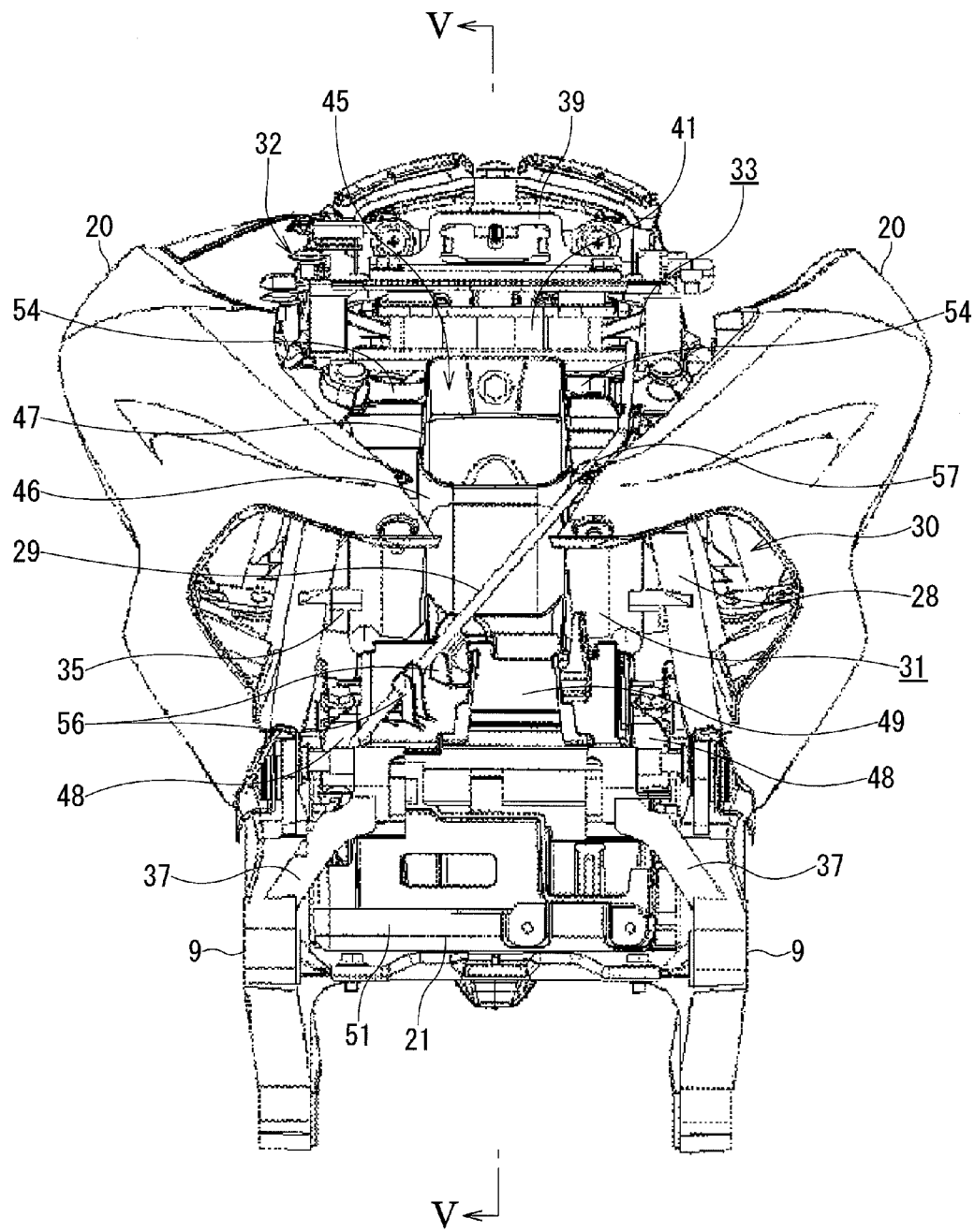
FIG. 4 shows the rear part viewed from a direction of an arrow IV in FIG. 3.
Figure 5:
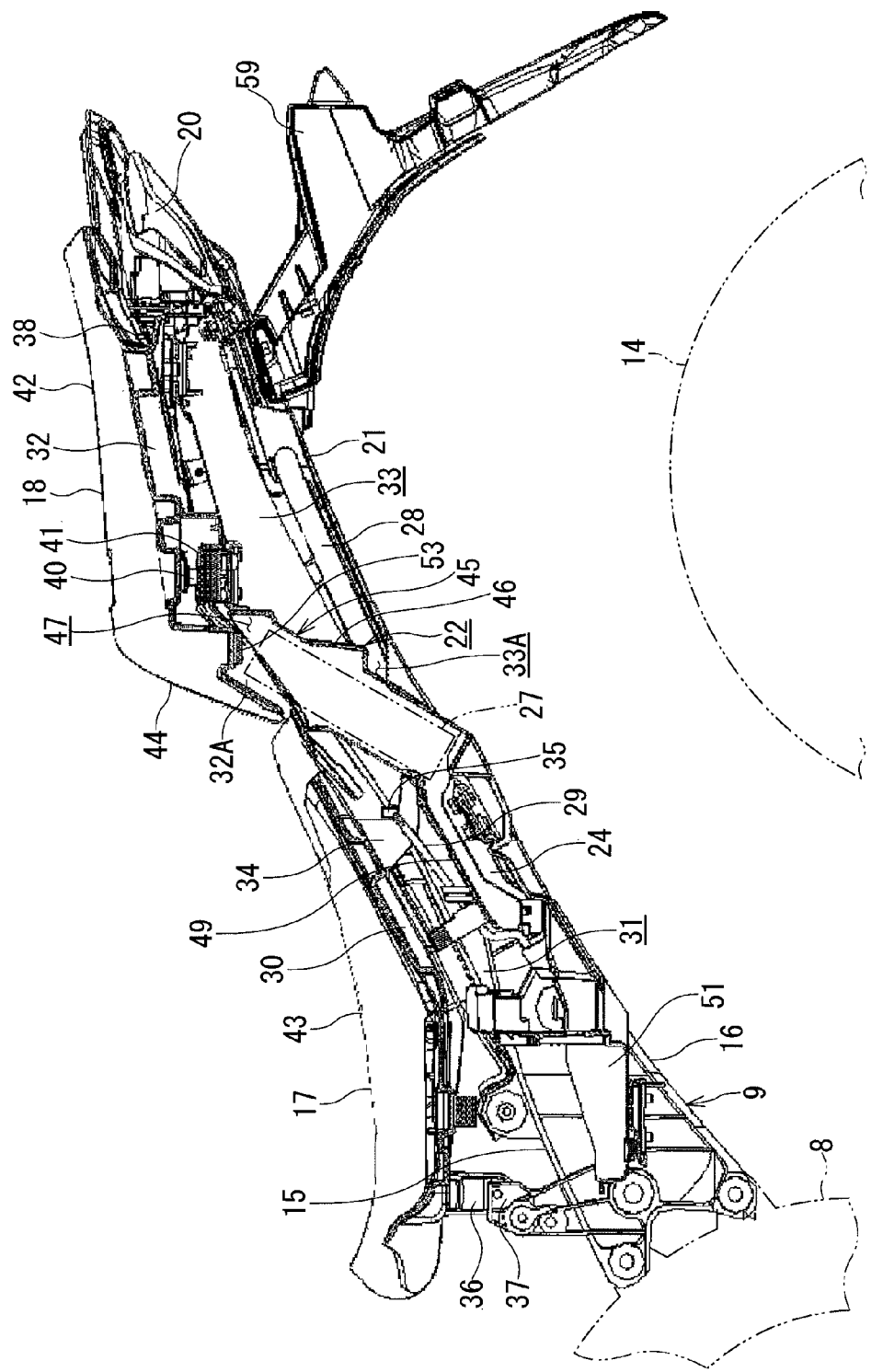
FIG. 5 is a cross sectional view taken along the line V-V in FIG. 4.

As shown in FIGS. 3 to 5, a rear fender 21 that covers above the rear wheel 14 is disposed between the left and right rear frames 9. The rear fender 21 extends obliquely rearward and upward along the bottom edge of the seat pillar sections 16 of the rear frames 9. As shown in FIG. 8, a rear fender cover 58 is attached to a rear lower part of the rear fender 21, and then a mud guard 59 is attached to the rear lower part of the rear fender 21. The rear fender 21 is supported by the rear frames 9 at the rear end and the front end.

As shown in FIGS. 3 to 5, a storage space 22 for storing articles including onboard auxiliary machinery and baggage is defined by the rear fender 21, the frame covers 20, the rider's seat 17 and the passenger seat 18. The onboard auxiliary machinery includes a battery 23, an ECU 24, a fuse box 25 and a tilt sensor 26. The baggage includes an onboard tool kit 27, a U-lock 28 and a bar-shaped tool 29 (for example, a tank rod for keeping the fuel tank upright during maintenance of the motorcycle).

The storage space 22 includes an onboard auxiliary machinery storage compartment 31 for storing the onboard auxiliary machinery having an opening 30 formed below the rider's seat 17 and an article storage compartment 33 for storing articles including the baggage having an opening 32 disposed below the passenger seat 18. The article storage compartment 33 extends from a portion directly below the opening 32 toward the front side of the motorcycle.

The rider's seat 17 and the passenger seat 18 are formed separately as independent portions. As shown in FIG. 5, the rider's seat 17 is fixed by a front mount portion 36 thereof engaged with a seat mount portion 37 of the rear frame 9 and a rear engaging portion 34 thereof engaged with a seat engaging portion 35 of the rear frame 9. Thus, the opening 30 of the onboard auxiliary machinery storage compartment 31 is normally closed by the rider's seat 17.

The passenger seat 18 is fixed through the engagement of a rear engaging portion 38 with a frame engaging portion 39 (FIG. 4) of the rear frame 9 and through the engagement of a front hook 40 with a seat lock striker 41 serving as a lock device mounted on the rear frame 9. The seat lock striker 41 is unlocked by key manipulation to thereby release the front hook 40. Therefore, the opening 32 of the article storage compartment 33 can be opened by opening the passenger seat 18 by unlocking the seat lock striker 41 or closed by closing the passenger seat 18 by locking the seat lock striker 41.

An upper surface 42 of the passenger seat 18 is located above the rider's seat 17, and the front end of the passenger seat 18 extends downward to substantially the same level as an upper surface 43 of the rider's seat 17. Therefore, the front end of the passenger seat 18 serves as a waist holding portion 44 that holds the waist of the rider. As shown in FIGS. 3 and 5, a front portion 32A of the opening 32 of the article storage compartment 33 constitutes a portion expanded forward of the motorcycle body along the lower edge of the waist holding part 44 of the passenger seat 18.

As shown in FIG. 5, an article holding member 45 formed separately from the rear fender 21 so as to extend upward from the upper surface of the rear fender 21 disposed below the rider's seat 17 toward a front side region 33A of the article storage compartment 33 located rearward and upward of the upper surface of the rear fender 21.

Figure 6:
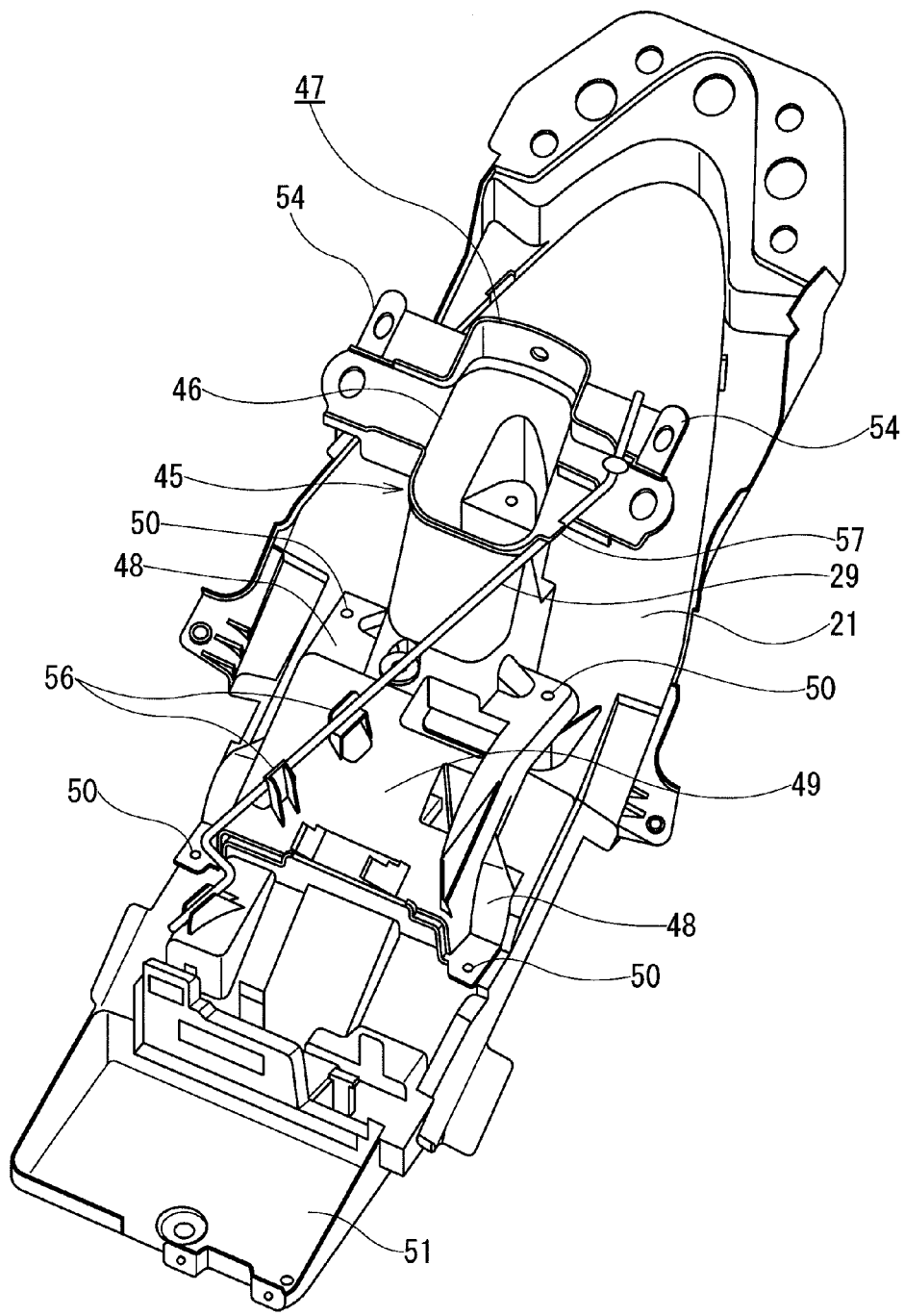
FIG. 6 is a perspective view of a rear fender and an article (baggage) holding member shown in FIG. 5.

As shown in FIGS. 6 and 8, the article holding member 45 includes a tubular main body 46 formed with an upper end opening 47 and mount flanges 48 formed integrally with the lower end portion of the main body 46 so as to serve as a mount portion. A box-shaped onboard auxiliary machinery holding member 49, which is opened downward, is formed integrally with the main body 46 and the mount flanges 48.

The attachment flanges 48 are formed on the laterally opposite sides of the onboard auxiliary machinery holding member 49 and utilized to attach the article holding member 45 and the onboard auxiliary machinery holding member 49 to the rear fender 21. More specifically, the mount flange 48 are formed with through holes 50 at forward and rearward portions of the motorcycle body, and the article holding member 45 and the onboard auxiliary machinery holding member 49 are fastened to the rear fender 21 by means of bolts, not shown, to be inserted into the through holes 50.

Figure 7:
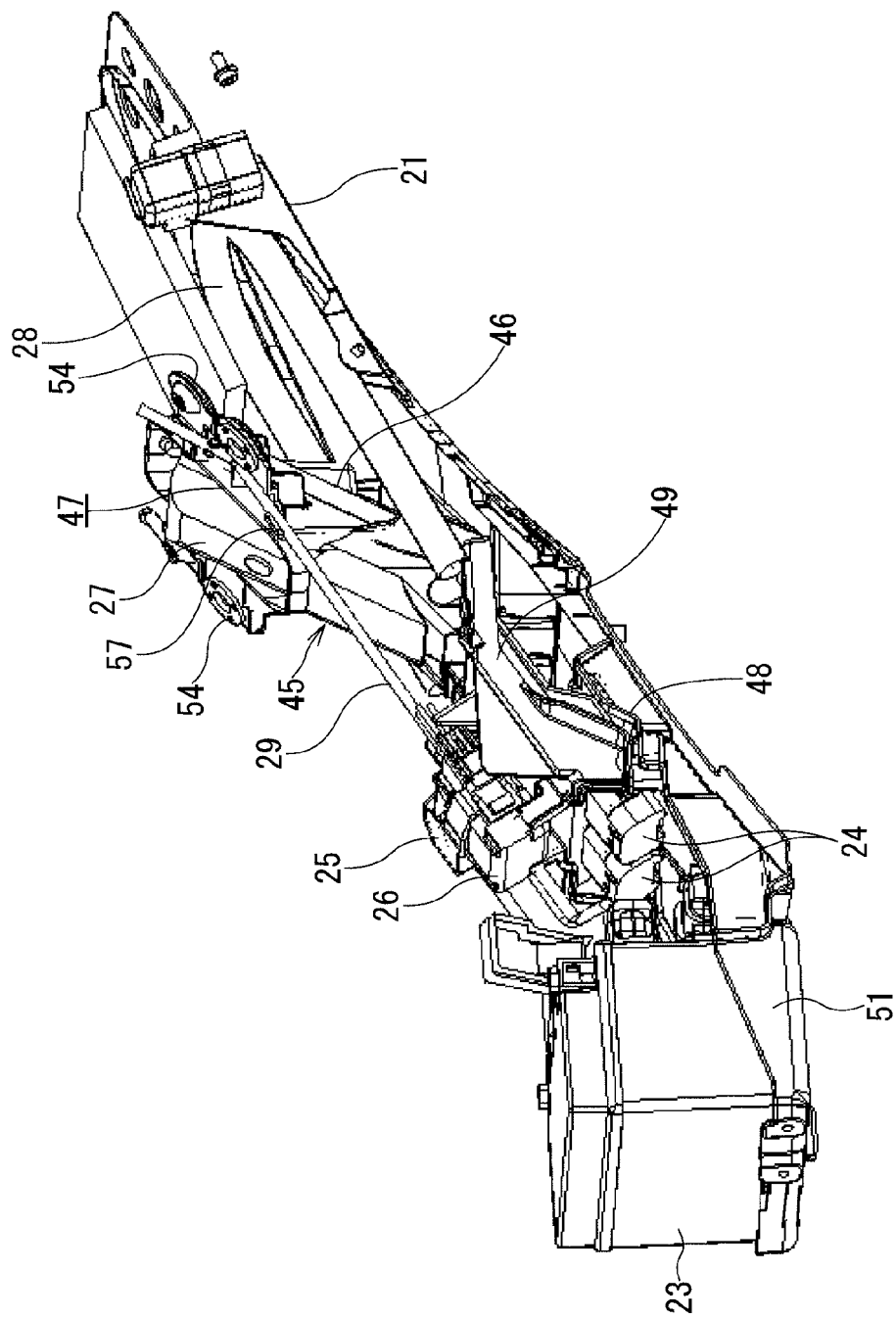
FIG. 7 is a perspective view of the rear fender and the article holding member shown in FIG. 5 as well as onboard auxiliary members or baggage.

As shown in FIGS. 5 and 7, under the condition such that the rear fender 21 is attached to the rear frames 9, the mount flange 48 of the article holding member 45 extends from the lower end portion of the main body 46 toward the onboard auxiliary machinery storage compartment 31 located forward of the motorcycle body along the upper surface of the rear fender 21 along with the onboard auxiliary machinery holding member 49.

The fuse box 25, the tilt sensor 26 and the like are disposed on the upper surface of the onboard auxiliary machinery holding member 49, and the ECU 24 is held between the lower surface of the onboard auxiliary machinery holding member 49 and the rear fender 21. The battery 23 is held in a battery holder 51 located on a front end portion of the rear fender 21. In this manner, the fuse box 25, the tilt sensor 26, the ECU 24 and the battery 23 are held within the onboard auxiliary machinery storage compartment 31.

The main body 46 of the article holding member 45 is a member for storing articles, baggage and the like specifically such as onboard tool kit 27, and the main body 46 is disposed in the front region 33A of the article storage compartment 33 arranged in front of the seat lock striker 41 in the article storage compartment 33. Therefore, the upper end opening 47 of the main body 46 is positioned within the article storage compartment 33 in the front portion 32A of the opening 32 thereof. The onboard tool kit 27 stored in the main body 46 is held in the main body 46 under pressure by a stopper 53 disposed on the bottom of the waist holding portion 44 of the passenger seat 18.

As shown in FIGS. 6 to 8, the main body 46 is provided with upper end flanges 54 protruding in the opposing lateral directions from portions near the upper end opening 47. As shown in FIGS. 3 and 4, the upper end flanges 54 are fastened to the pair of left and right rear frames 9, respectively. Thus, the rear fender 21, which is supported by the rear frames 9 at the front and rear end portions, is suspended from the rear frames 9 at the central portion through the article holding member 45.

As shown in FIGS. 3 to 5, the baggage holding member 45 is disposed at the central portion in the lateral direction in the rear region of the onboard auxiliary machinery storage compartment 31 and the front region 33A of the article storage compartment 33. Therefore, in the front region 33A of the baggage storage compartment 33, articles can be stored in the spaces on the laterally opposite sides of the article holding member 45. For example, an article or baggage, such as U-lock 28 having a substantially U shape, can be stored in the space as shown in FIG. 7.

Furthermore, as shown in FIGS. 4 and 6, the main body 46 of the article holding member 45 has a rear engaging portion 57 protruding from a portion near the upper end opening 47, and the onboard auxiliary machinery holding member 49 has a pair of front engaging portions 56 protruding from portions near the mount flanges 48. The front engaging portions 56 and the rear engaging portion 57 are positioned on both the laterally opposite sides of the central portion of the main body 46. The bar-shaped tool 29 is inserted into opening 32 of the article storage compartment 33 so as to be engaged with and held, at both the end portions thereof, by the front and rear engaging portions 56 and 57, respectively.

According to the present embodiment of the structures and characters mentioned above, the following advantageous functions and/or effects (1) to (8) will be attainable.

(1) The article holding member 45 is disposed in the article storage compartment 33, which has the opening 32 below the passenger seat 18 in which the tubular main body 46 extends upward, and the onboard tool kit 27 and the other articles or baggage are stored in the main body 46. Therefore, the onboard tool kit 27 can be easily taken out from or stored in the article storage compartment 33 simply by opening the passenger seat 18, and the onboard tool kit 27 can be reliably held in the main body 46 by the pressing force of the stopper 53 on the passenger seat 18 simply by closing the passenger seat 18. Thus, the onboard tool kit 27 does not need to be fixed by a rubber band or the like and can be conveniently stored or removed, and the convenience for use can be also improved.

(2) In the article storage compartment 33, the onboard tool kit 27 is stored in the main body 46 of the article holding member 45, and the other articles than the onboard tool kit 27 are stored in the regions other than the article holding member 45. In short, the onboard tool kit 27 and the other articles can be separately stored, and accordingly, the onboard tool kit 27 and the other articles can be more easily stored and removed.

(3) It is necessary for the onboard auxiliary machinery holding member holding the onboard equipment and the holder holding the bar-shaped tool 29 to be formed in conformity with the onboard auxiliary machinery and bar-shaped tool 29, respectively, so that the shapes and structures thereof may be complicated. Therefore, if they are formed integrally with the rear fender 21, the molding die for the rear fender 21 is obliged to make enlarge and have a complicated structure.

However, according to the embodiment of the present invention, the onboard auxiliary machinery holding member 49 is formed integrally with the article holding member 45 and is formed separately from the rear fender 21, and in addition, the front engaging parts 56 and the rear engaging part 57 that hold the bar-shaped tool 29 are formed integrally with the onboard auxiliary machinery holding member 49 and the article holding member 45, respectively, which are formed integrally with each other. Therefore, the molding die for the rear fender 21 has a simple structure, and the productivity of the die is improved, thus, the manufacturing cost being reduced.

(4) The onboard auxiliary machinery holding member 49 is formed separately from the rear fender 21 but integrally with the article holding member 45. Therefore, the onboard auxiliary machinery including the ECU 24, the fuse box 25 and the tilt sensor 26 can be preliminarily assembled on the onboard auxiliary machinery holding member 49. Therefore, the assembling working of the onboard auxiliary machinery can be performed in a production line in the pre-assembling stage other than the assembling line of the motorcycle 1. Thus, the motorcycle 1 can be manufactured with improved flexibility with reduced manufacturing cost.

(5) The rear fender 21 is supported directly by the rear frames 9 at the front end portion and the rear end portion thereof and is also suspended by the rear frames 9 at the central portion by the article holding member 45. Therefore, the supporting strength of the rear fender 21 is increased, and the durability thereof can be improved.

For example, even if the onboard tool kit 27 in the main body 46 of the article holding member 45 receives an impact load when the motorcycle is running, the rear frames 9 bear the impact load and prevent the rear fender 21 from damaging.

(6) Since, the mount flanges 48 of the article holding member 45 supported by the rear frames 9 are fastened to the rear fender 21 in such a manner as described above, the rear fender 21 provides partially a double structure by the mount flange 48, thereby improving the rigidity of the rear frame and hence preventing the rear fender 21 from being vibrated.

(7) Since the passenger seat 18 has the waist holding portion 44, the opening 32 of the article storage compartment 33 has the front portion 32A as a forward extension. Accordingly, since the area of the opening 32 of the article storage compartment 33 is enlarged by the front portion 32A of the opening 32, the article or baggage can be more easily stored in or removed from the article storage compartment 33.

(8) Since the onboard tool kit 27 is not fixed, for example, by means of a fixing band such as a rubber band, it is not necessary to form the hooks for engaging the fixing band to the rear fender 21. Therefore, it is also not required to form any hole, which may be formed when the hooks are formed, in the rear fender, so that muddy water or the like is prevented from entering the article storage compartment 33 and the onboard auxiliary machinery storage compartment 31 through these holes.

It is further to be noted that the present invention is not limited to the described embodiment and many other changes and modifications may be made without departing from the scopes of the appended claims.

What is claimed is:

1. An article storage structure of a motorcycle, the structure comprising:
    a storage space for storing articles including onboard auxiliary machinery, wherein the storage space is defined by a rear fender covering a rear wheel, a frame cover covering a rear portion of a motorcycle body, and a rider's seat and a separate passenger seat which are arranged in tandem in a longitudinal direction of the motorcycle,
    wherein the storage space includes an onboard auxiliary machinery storage compartment for storing onboard auxiliary machinery and a separate article storage compartment for storing articles,
    wherein the onboard auxiliary machinery storage compartment has an opening formed below the rider's seat, and
    wherein the article storage compartment has an opening formed below the passenger seat, wherein the opening of the article storage compartment is opened and closed by opening and closing the passenger seat,
    wherein the structure further comprises an article holding member including a tubular main body disposed so as to extend rearward and upward from an upper surface of the rear fender below the rider's seat to a region of the article storage compartment, the article holding member having an upper end opening disposed within the article storage compartment.

2. The article storage structure of claim 1, wherein the article holding member is formed independently from the rear fender, wherein the tubular main body of the article holding member has an upper end opening in which an article is stored and a mount portion extending from a lower end of the main body toward the onboard auxiliary machinery storage compartment located on a front side of the motorcycle body along an upper surface of the rear fender and is fastened to the rear fender, and wherein the article holding member also includes an onboard auxiliary machinery holding member that holds the onboard auxiliary machinery and is formed integrally with the mount portion.

3. The article storage structure of claim 2, wherein the article holding member is provided with engaging members configured to engage with a front portion and a rear portion of a bar-shaped tool article on laterally opposite sides at a front side portion of the rear portion of the motorcycle body at portions in vicinities of the upper end opening and the mount portion to the rear fender, respectively.

4. The article storage structure of claim 1, wherein the rider's seat and the passenger seat are formed independently from each other, the rider's seat is fixed to the body of the motorcycle, and the opening of the passenger seat locked by a locking member to be opened or closed by means of a key.

5. The article storage structure of claim 1, wherein the rear fender, the frame cover, the rider's seat and the passenger seat defining the article storage space are supported by a rear frame, and the rear fender extends along a lower edge of the rear frame so as to be supported by the rear frame at front and rear portions thereof and the rear fender is also suspended by the rear frame at a central portion thereof by the article holding member, which is disposed on the rear fender, in which the central portion is attached to the rear frame at an upper end portion.

6. The article storage structure of claim 1, wherein the passenger seat has an upper surface located above the rider's seat and a front end portion extending downward to substantially a same level as the upper surface of the rider's seat so as to form a waist holding portion, and a front portion of the opening of the article storage compartment is formed along a lower edge of the waist holding portion.

7. The article storage structure of claim 6, wherein the article holding member is disposed so that the upper end opening of the article holding member faces the opening of the article storage compartment.

8. The article storage structure of claim 1, wherein the article holding member is disposed at a central position in the lateral direction of the motorcycle in a front of the article storage compartment.

* * * * *